(12) United States Patent
Achenbach et al.

(10) Patent No.: US 6,194,508 B1
(45) Date of Patent: Feb. 27, 2001

(54) SILICONE ELASTOMERS

(75) Inventors: Frank Achenbach, Simbach/Inn; Herbert Barthel, Emmerting; Christian Finger, Burghausen, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/248,127

(22) Filed: Feb. 10, 1999

(30) Foreign Application Priority Data

Feb. 26, 1998 (DE) ................................. 198 08 116

(51) Int. Cl.$^7$ ..................................... C08K 3/36
(52) U.S. Cl. ................. 524/492; 524/497; 524/448; 524/430; 528/24; 264/299
(58) Field of Search ..................... 524/492, 497, 524/448, 430; 528/24; 264/299

(56) References Cited

U.S. PATENT DOCUMENTS 4,935,483    6/1990    Gamon et al. .

FOREIGN PATENT DOCUMENTS

| 32 43 194 A1 | 5/1984 | (DE) . |
| 37 26 010 A1 | 2/1989 | (DE) . |
| 04161458 | 6/1992 | (JP) . |
| 906937 * | 2/1982 | (SU) . |

OTHER PUBLICATIONS

Silicones, G. G. Freeman, Plastics Institute, pp. 69–70 and 80, 1962.*
Derwent Abstract (84–134984/22) corresponding to DE 32 43 194.
Derwent Abstract (92–238594/29) corresponding to JP 04 161458.
English Abstract corresponding to DE 32 43 194.

* cited by examiner

Primary Examiner—Robert Dawson
Assistant Examiner—Kino-Liang Peng
(74) Attorney, Agent, or Firm—Brooks & Kushman P.C.

(57) ABSTRACT

Peroxidically crosslinkable silicone rubber compositions containing a filler which has covalently bound Si—H-containing groups exhibit lower tendency toward yellowing while maintaining or increasing other elastomer physical properties and processing properties.

19 Claims, No Drawings

SILICONE ELASTOMERS

TECHNICAL FIELD

The invention relates to peroxidically crosslinkable silicone rubber compositions, their preparation and articles in which they are present.

BACKGROUND OF THE INVENTION

Peroxidically crosslinked silicone elastomers, generally referred to as HTV (high temperature vulcanizing) silicone rubber have a certain, undesirable yellow coloration absent from addition-crosslinked silicone elastomers. This yellowing is very well-known, and numerous attempts have been made to prevent or reduce this undesirable coloration. It is known that yellowing depends on numerous influencing factors which explains why the degree of yellowing varies greatly. For example, peroxidically crosslinked silicone elastomers are only slightly yellowish immediately after preparation, i.e. in the untempered state. However, after thermal post-treatment, for example for 4 hours at 200° C., which is indispensable for many applications, yellowing is particularly pronounced. It is also known that the type of peroxide used has, for an otherwise unchanged composition, a considerable influence on the degree of yellowing. Thus, silicone elastomers which have been crosslinked by means of dicumyl peroxide are significantly more yellow than those which have been crosslinked using bis(2,4-dichlorobenzoyl) peroxide.

JP 04161458 (S ETSU CHEM IND CO LTD) describes the use of specific peroxides, namely dialkyl peroxides, in combination with an inorganic or organic alkali metal base such as sodium hydroxide, sodium silanolate or sodium methoxide, with the latter being reacted with the filler-containing organopolysiloxane composition at elevated temperature before the addition of peroxide. A disadvantage of this process is, inter alia, that it is generally restricted to certain peroxides because of the different methods of preparing the silicone elastomers (extrusion or compression molding). In other words, there is no free choice of peroxide. In addition, the basic alkali metal compounds added leads to a series of undesirable secondary reactions, results in disadvantages in the process, can increase the tendency of the compound to stick to the rolls, can cause difficulties in removal of the crosslinked silicone elastomer from the mold, and can have an adverse effect on the final properties of the silicone elastomers, e.g. compression set and thermal stability.

A further factor which causes and/or influences yellowing is the presence of nitrogen-containig residues in the HTV polymer or filler used. These residues can originate from the $PNCl_2$ catalyst used in the preparation of the polymer or from silazane residues or products formed from them. Factually, yellowing can in many cases be reduced a limited amount by intensive kneading at elevated temperatures i.e. careful elimination of such residues, but this is associated with additional process steps which are not economically acceptable.

It would be desirable to provide additives which can be added to the uncrosslinked HTV silicone rubber composition and reduce yellowing. According to the prior art, the additives disclosed by the following references are known to be useful for this purpose.

DE 3726010 (WACKER-CHEMIE GMBH) describes peroxidically crosslinkable silicone rubber compositions to which organopolysilanes are added to reduce yellowing. Although a significant reduction in yellowing can be achieved in this way, considerable disadvantages have to be accepted; these relate, in particular, to significantly higher compression set values and an increase in the surface tack and adhesion, which can be associated with processing disadvantages (tendency to stick to the rolls, poorer demoldability) and undesirable final properties (surface tack).

DE 3243194 (DEGUSSA AG) teaches the use of polymethylhydrogensiloxane (H-siloxane) which is added to the peroxidically crosslinkable silicone rubber composition in amounts of from 0.1 to 2% by weight (based on the total composition) as an additive to reduce yellowing. In numerous cases, yellowing can be significantly reduced or even eliminated completely in this way. However, it has been noted that frequently, significantly higher amounts of H-siloxane than the amounts disclosed as useful must be used to achieve a satisfactory reduction in yellowing. In these cases in particular, but also in other cases, the use of the relatively low molecular weight polymethylhydrogensiloxanes creates disadvantages in processing which result, first in an increased tendency of the compoumd to stick to the rolls, and second, in difficulty in removing the crosslinked silicone elastomers from the mold (also referred to as mold adhesion). This is understandable since H-siloxane is known to be used as a coupling agent.

It is known that the tendency to yellowing can be reduced by intensively kneading the silicone rubber composition at high temperatures (>150° C.) for a number of hours. The occurrence of yellowing is then a particular disadvantage if the process for preparing the silicone rubber composition does not include such a (time-consuming and energy-intensive) baking-out step. In these cases in particular, relatively high amounts of H-siloxane are necessary to reduce yellowing and the associated disadvantages become particularly serious.

DISCLOSURE OF THE INVENTION

It is an object of the invention to remedy the disadvantages of the prior art and, in particular, to provide peroxidically crosslinkable silicone rubber compositions which have reduced yellowing.

DESCRIPON OF THE PREFERRED EMBODIMENTS

The invention provides peroxidically crosslinkable silicone rubber compositions containing a filler which has covalently bound Si—H-containing groups.

The peroxidically crosslinkable silicone rubber compositions of the invention preferably comprise (A) organosiloxanes comprising units of the formula $$R^1_a SiO_{(4-a)/2} \qquad (I),$$

where the radicals $R^1$ can be identical or different and are each a substituted or unsubstituted hydrocarbon radical having from 1 to 20 carbon atoms or are H or OH and a is 0, 1, 2 or 3, (B) a filler which has covalently bound SiH-containing groups, (C) if desired, other reinforcing and/or nonreinforcing fillers which are SiH-free, (D) peroxide(s) which promote the crosslinking of the silicone rubber composition, preferably organic peroxides, (E) other additives such as heat stabilizers, plasticizers, mold release agents, coupling agents, hydrophobicizing agents, flame retardants, UV absorbers, silicone resins, etc.

With reference to component A, preferred examples of substituted or unsubstituted hydrocarbon radicals $R^1$ are alkyl radicals such as methyl, ethyl, propyl, isopropyl, tert-butyl, n-octyl, 2-ethylhexyl and octadecyl radicals; alkenyl radicals such as vinyl, allyl, hexenyl and undecenyl radicals; cycloalkyl radicals such as the cyclopentyl or cyclohexyl radicals; cycloalkenyl radicals such as the cyclopentenyl or cyclohexenyl radicals; aryl radicals such as the phenyl, tolyl, xylyl or naphthyl radicals; aralkyl radicals such as the benzyl or phenylethyl radicals; and also halogenated and/or organofuccconalized derivatives of the above radicals, e.g. the 3,3,3-trifluoropropyl or cyanomethyl radicals.

Preferred radicals $R^1$ are methyl, vinyl, phenyl and 3,3,3-trifluoropropyl radicals.

Alkyl radicals, in particular methyl radicals, are preferably bound to at least 70 mol % of the Si atoms present in the organopolysiloxane comprising units of the formula (I). If Si-bonded vinyl and/or phenyl radicals are present in the organopolysiloxanes (A) in addition to Si-bonded methyl and/or 3,3,3-trifluoropropyl radicals, then the former are present in amounts of from 0.001 to 30 mol %.

The organosiloxanes (A) preferably consist predominantly of diorganosiloxane units. The end groups of the organopolysiloxanes (A) are preferably trialkylsiloxy groups, in particular the trimethylsiloxy radical or the dimethylvinylsiloxy radical; however, one or more of the alkyl radicals present in the chain and/or terminal siloxane units can also be replaced by hydrogen, hydroxy groups or alkoxy groups such as methoxy and ethoxy radicals.

The organopolysiloxanes (A) can range from low-viscosity liquids to highly viscous, paste-like substances. The organopolysiloxanes (A) preferably have a viscosity of from 100 mPa·s to 200,000 Pa·s, measured using a Brookfield viscometer at a temperature of 25° C. Particular preference is given to organopolysiloxanes having a viscosity of from 100,000 mPa.s to 50,000 Pa.s. It is also possible to use mixtures of different organopolysiloxanes (A) as described above. Organopolysiloxanes (A) are preferably used in amounts of from 20 to 99% by weight, particularly preferably in amounts of from 55 to 80% by weight, based on the total composition.

The constituent (B) which is essential to the silicone rubber composition of the invention is a filler which has covalently bound SiH-containing groups on its surface. In principle any filler can be modified by means of covalently bound SiH-containing organosilicon compounds. The effect to be preferably achieved, namely prevention of yellowing, only makes sense if the filler selected does not itself cause discoloration of the silicone elastomer. Hence, carbon blacks and colored pigments, for example, which have covalently bound SiH groups are not useful. Preference is therefore given only to those fillers which have no color of their own and are sufficiently finely divided so as not to hinder the preparation of a transparent and colorless or at least opaque white silicone elastomer. These include, for example, pyrogenic silicas, precipitated silicas, silicone resins, quartz flour, finely divided metal oxides and hydroxides such as titanium dioxide, aluminum oxide, aluminum hydroxide and zinc oxide, finely divided metal salts such as barium sulfate, calcium carbonate and zirconium silicate, and diatomaceous earth, as long as these contain covalently bound SiH groups. Particularly preferred fillers are SiH- containing pyrogenic silicas, precipitated silicas, quartz flours and silicone resins. For the purposes of the present invention, silicone resins are branched and network- like polysiloxanes which are preferably composed of trifunctional and/or tetraflunctional units of the formulae $R^1SiO_{3/2}$, $HSiO_{3/2}$, and $SiO_{4/4}$. Monofunctional and/or bifunctional units of the formulae $R_{13}SiO_{1/2}$, $HR^1_2SiO_{1/2}R^1_2SiO_{2/2}$ and $HR^1SiO_{2/2}$, can also be present in a minor proportion in the silicone resins. Overall, however, at least one of the SiH-containing units has to be present. Silicone resins can additionally contain up to 10 mol % of Si-bonded OH or $R^1O$ groups.

With regard to the effects on the mechanical property profile of the silicone elastomers in which they are present, a distinction may be made between reinforcing and nonreinforcing fillers. Reinforcing fillers have high specific surface areas (measured by the BET method in accordance with DIN 66131 and DIN 66132). Pyrogenic and precipitated silicas having a specific surface area of from 0.1 m²/g, preferably 1 m²/g, to 400 m²/g are particularly preferred since the large specific surface area makes possible a high content of covalently bound SiH on the surface. Fillers having a low specific surface area are correspondingly less suitable.

As regards the method of preparation, preference is given to those silicas which are obtained either by wet chemical precipitation (precipitated silicas) or pyrogenically by flame hydrolysis, e.g. of chlorosilanes (pyrogenic silicas).

The silicas which are preferably used have a hydrodynamic diameter of the silica aggregates of less than 10 μm, particularly preferably less than 1 μm, in particular in the size range from 100 to 1000 nm. The specific surface area of the silicas which are preferably used is greater than 1 m²/g, particularly preferably from 20 m²/g to 400 m²/g (measured by the BET method in accordance with DIN 66131 and 66132). Hydrophilic and hydrophobic silicas can be used.

To bind SiH groups covalently to the surface of the above-described fillers, preference is given to using those SiH-containing organosilicon compounds which have a fumctionality capable of acting as silylating agent, i.e. compounds which can react with the groups present on the filler surface, e.g. silanol groups or metal-OH groups in general. These include organosilicon compounds of the structure

where $a = 1, 2$ or 3, preferably 1, $b = 1, 2$ or 3, preferably 2, $c = 1, 2$ or 3, preferably 1, and $a + b + c = 4$.

The radical $R^2$ is a hydrocarbon radical having from 1 to 18 carbon atoms.

X is a hydrolyzable group which does not form a basic leaving group during the reaction. X is preferably a halogen such as Cl or Br, particularly preferably Cl, or X may be an alkoxy group having from 1 to 8 carbon atoms, e.g. —OMe, —OEt, —OPr, —OBu. Preferred alkoxy groups are —OMe or —OEt. In the receding formulae, Me is methyl, Et is ethyl, Pt is propyl, and Bu is butyl.

Also suitable are oligomeric or polymeric organosilicon compounds comprising units of the structure

where $a = 1, 2$ or 3, preferably 1, $b = 1, 2$ or 3, preferably 2,

-continued $$c = 1, 2 \text{ or } 3, \text{ preferably } 1,$$

$$\text{and } a + b + c = 4$$

having a viscosity of up to 10,000 mPas, preferably those which additionally contain one or more silanol and/or alkoxy groups.

$R^2$ is as defmed above. Preferred examples of $R^2$ are: alkyl radicals such as the methyl radical, the ethyl radical, propyl radicals such as the iso- or n-propyl radicals, butyl radicals such as the t- or n-butyl radicals, pentyl radicals such as the neo-, iso- or n-pentyl radicals, hexyl radicals such as the n-hexyl radical, heptyl radicals such as the n-heptyl radical, octyl radicals such as the 2-ethylhexyl or n-octyl radicals, decyl radicals such as the n-decyl radical, dodecyl radicals such as the n-dodecyl radical, hexadecyl radicals such as the n-hexadecyl radical, and octadecyl radicals such as the n-octadecyl radical; alkenyl radicals such as the vinyl, 2-allyl or 5-hexenyl radicals; aryl radicals such as the phenyl, biphenyl or naphthenyl radicals; alkylaryl radicals such as benzyl, ethylphenyl, tolyl or xylyl radicals; halogenated alkyl radicals such as the 3-chloropropyl, 3,3,3-trifluoropropyl or perfluorohexylethyl radicals; and halogenated aryl radicals such as the chlorophenyl and chlorobnzyl radicals. For reasons of availability, $R^2$ is particularly preferably a methyl radical.

Preferred examples of silylating agents are trichlorosilane, trimethoxysilane, triethoxysilane, methyldichlorosilane, methyldimethoxysilane, methyldiethoxysilane, dimethylchlorosilane, dimethylmethoxysilane and dimethylethoxysilane. Particular preference is given to methyldichlorosilane, methyldimethoxysilane and methyldiethoxysilane.

Other suitable silylating agents are oligosiloxanes or polysiloxanes containing Si—H groups, in particular polymethylhydrogensiloxanes, having a viscosity of up to 1000 iPas, which can, if desired, be diluted with suitable, neutral or nonbasic solvents, and also tetramethyldisilazane. It is also possible to use other SiH-containing silylating agents such as N irethylsilyl-2-oxazolidinone, tert-butylaminodimethylsilane, N,N'-(dimethylsilyl)urea and bis(dimethylsilyl)acetamide. It is also possible to use mixtures of silylating agents.

The silylation of the fillers can be carried out in the presence of additives such as water and, if desired, neutral or nonbasic solvents such as aliphatic alcohols, e.g. MEOH, EtOH, n-PrOH, iso-PrOH, n-BuOH, iso-BuOH; alcohol/water mixtures; ethers such as diethyl ether or tetrahydrofuran; ketones such as methyl isobutyl ketone (MIBK); and hydrocarbons such as n-hexane, cyclohexane, toluene, or mineral oils.

The preparation of an SiH-ontaining filler can be carried out, for example, using the ratios described hereinafter. Preferably, 100 parts by weight of silica are reacted, per 100 $m^2/g$ of their specific surface area, with from 0.01 to 100 parts by weight of silylating agent based on each 100 glmol of molecular weight of the silylating agent; it is possible to add from 0.01 to 100 parts of water and solvents. Preference is given to adding from 0.1 to 5% by weight of Si—H.

The preparation of an SiH-containing filler can be carried out, for example, under the following general reaction conditions. The silica and the silylating agents are intensively mixed, for example but not by limitation, by fluidizing the silica, by stirring, or by means of an inert gas flow, and spraying the silylating agents and the auxiliaries onto the filler as a very fine aerosol. This can, however, also be carried out in a suitable solvent which is neutral or nonbasic. The mixing time is from 1 second to 8 hours, preferably from 5 minutes to 60 minutes, and the reaction time is from 1 minute to 24 hours, preferably from 15 minutes to 2 hours. Mixing is advantageously carried out at from room temperature to about 150° C. and the reaction is also advantageously carried out at room temperature to about 150° C., preferably from 50 to 120° C. This is followed by a purification step to remove volatiles, preferably by heating at from 100 to 400° C., preferably in an inert atmosphere, i.e. at a reduced oxygen content of <10%. The amount of SiH-containing finer present in the silicone rubber composition of the invention depends firstly on the SiH content of the filler and secondly on the desired degree of reduction of yellowing. HTV silicone rubber compositions not containing constituent (B), which crosslink to form elastomers having intense yellowing, require higher contents of constituent (B) to avoid yellowing than compositions which, in the absence of constituent (3) would produce only slightly yellowish elastomers. The silicone rubber compositions of the invention preferably contain, based on the total composition weight, from 1 ppm by weight to 2000 ppm by weight of Si-bonded hydrogen, preferably from 10 ppm by weight to 500 ppm by weight, these amounts of Si-bonded hydrogen originating exclusively from the SiH content of the filler (B). The content of filler (B), based on the total composition, is generally from 0.1% by weight to 80% by weight, preferably from 1% by weight to 30% by weight.

SiH-free fillers, component (C), include all fillers customarily used in HTV silicone rubber compositions, and may be present, according to the invention, up to a content of 80% by weight based on the total composition; the total filler content (sum of constituents (B) and (C)) is preferably from 10% by weight to 50% by weight.

Examples of fillers which may be present according to the invention are precipitated silicas and pyrogenic silicas, both in hydrophilic and hydrophobic form, quartz flours, finely divided metal oxides or salts which are not colored, chalk, gypsum, diatomaceous earths, silicone resins, glass fibres and very fine polymer powders.

Preferred examples of suitable organic peroxides (D) are dicumyl peroxide, dibenzoyl peroxide, bis(4-methylbenzoyl) peroxide, bis(2,4-dichlorobenzoyl) peroxide, and 2,5-bis(tert-butylperoxy)-2,5-dimethylhexane.

Particularly preferred peroxides are 2,5-bis(tert-butylperoxy)-2,5-dimethylhexane and dicumyl peroxide. It is possible to use mixtures of various peroxides. This list of peroxides is non-limiting.

Peroxide (D) is present in the silicone rubber compositions of the invention in amounts of preferably from 0.4 to 2.0% by weight, particularly preferably from 0.7 to 1.5% by weight, in each case based on the total composition.

The silicone rubber composition of the invention may contain further additives (E) which are customary according to the prior art. These include, for example, heat stabilizers, processing aids, milling plasticizers, mold release agents, flame retardants, additives for reducing the compression set, and plasticizers. Such additives can be present up to a content of 50% by weight, preferably up to 10% by weight, based on the total composition.

The peroxidically crosslinkable silicone rubber compositions of the invention which contain SiH-containing fillers have excellent processing properties. In particular, there is no tendency to stick to the rolls; and no adhesion to the mold, unlike polymethylhydrogensiloxane-containing silicone rubber compositions of otherwise identical composition. In addition, there is no yellowing after either crosslinking or thermal after-treatment. The crosslinked silicone elastomers have a dry, non-tacky surface while silicone elastomers having increased H-siloxane contents display noticeable surface tack.

The silicone rubber composition of the invention can be used in an advantageous manner for producing transparent elastomeric moldings, coatings, jointing compounds, etc., for which HTV silicone rubbers are customarily used. Examples are seals for coffee machines, microwave ovens, thermos flasks, sterilizers and pressure cookers, cable sheathing and cable end connections, keyboards and spring elements for pocket calculators, telephones, computer games, teleprinters, switch covers and interconnectors, profiles for dry glazing, dialysis tubes, Foley catheters, anesthesia masks, diver's goggles, nipples for bottles, anesthesia bags, hoses, membranes and conveyor belts.

I.1 Preparation of an Si—H-containing fmely divided silica filler (B) using methylhydrogendichlorosilane 100 g of a pyrogenic silica having a specific BET surface area of 300 m$^2$/g (Wacker HDKO T30 silica), 12 g of water, 6 g of methanol and 25 g of dichloromethylsilane are intensively mixed for 30 minutes at room temperature. The reaction is subsequently completed at 80° C. for 2 hours. The material is then freed of volatile materials at 200° C. for 2 hours under a gentle stream of N$_2$. 102 g of a white powder are obtained. In the IR (DRIFT)), the product displays an intense band at 2160 cm$^{-1}$, characteristic of the Si—H vibration. The Si-bonded hydrogen content of this silica is 1200 ppm by weight.

I.2 Preparation of an Si—H-containing highly disperse silica filler using dimethylhydrogenchlorosilane 100 g of a pyrogenic silica having a specific BET surface area of 300 m$^2$/g (Wacker HDK® T30 silica), 10 g of water, 35.7 g of methanol and 52.6 g of dimethylhydrogenchlorosilane are intensively mixed for 30 minutes at room temperature. The reaction is subsequently completed at 80° C. for 2 hours. The material is then freed of volatile constituents at 200° C. for 2 hours under a gentle stream of N$_2$.102 g of a white powder are obtained. In the IR (DRIFT), the product displays an intense band at 2160 cm$^{-1}$, characteristic of the Si—H vibration. The Si-bonded hydrogen content of this silica is 580 ppm by weight.

I.3 Preparation of an Si—H-containing highly disperse silica filler using diethoxymethylhydrogensilane 100 g of a pyrogenic silica having a specific BET surface area of 300 m$^2$/g (Wacker HDK® T30 silica), 10 g of water and 20 g of diethoxymethylhydrogensilane are intensively mixed for 30 minutes at room temperature. The reaction is subsequently completed at 80° C. for 2 hours. The material is then freed of volatile constituents at 150° C. for 1 hour and at 200° C. for another 2 hours under a gentle stream of N$_2$.102 g of a white powder are obtained. In the IR (DRIFT), the product displays an intense band at 2160 cm$^{-1}$, characteristic of the Si—H vibration. The Si-bonded hydrogen content of this silica is 800 ppm by weight.

I.4 Preparation of an Si—H-free, hydrophobic highly disperse silica filler using hexamethyldisilazane (not according to the invention).

15 g of deionized water and then 45 g of hexamethyldisilaaane were mixed into 100 g of a pyrogenic silica having a specific BET surface area of 300 m$^2$/g (Wacker HDK® T30 silica) at 25° C. After homogenization for 30 minutes at 25° C. and a reaction time of 2 hours at room temperature, the silica is heated at 150° C. for 3 hours under a stream of nitrogen. This gives a hydrophobic silica having a carbon content of 4.6% by weight.

I.5 General procedure for preparation of a base mixture comprising organopolysiloxane and pyrogenic silica according to the invention (constituent (B)) and comparative examples (constituent (C) but no constituent (B)).

100 parts by weight of a linear dimethylvinylsiloxy-terminated polydimethylsiloxane having a viscosity measured at 25° C. of 26,000 Pa.s and a number average molecular weight of about 470,000 g/mol, which bears on statistical average one vinyl group for every 3200th silicon atom within the chain, are homogeneously mixed over a period of one hour with a total of 47.1 parts by weight, added a little at a time, of a hydrophobic silica whose composition is described in the examples in a laboratory kneader from Werner und Pfleiderer (Stuttgart, model LUK 1.0) at a temperature of 70° C. and a rotational speed of the kneader blades of 28 rpm. The mixture is subsequently kneaded for a further 2 hours at a temperature of 70° C. and atmospheric pressure.

I.6 Preparation of crosslinked silicone elastomers 100 parts by weight of the silicone rubber composition to be crosslinked prepared according to the following examples are homogeneously nmixed for 10 minutes at room temperature with 0.7 part by weight of dicumyl peroxide on a laboratory roll mill at a friction of 1:1.1. This peroxide-containing silicone rubber composition is immediately placed in stainless steel pressing molds and crosslinked for 10 minutes at a temperature of 170° C. in a hydraulic press. After crosslinking, the 6 mm thick silicone elastomer sheets are removed from the mold and heated for 4 hours at a temperature of 200° C. in a convection drying oven.

I.7 Characterization of the uncrosslinked silicone rubber composition and the crosslinked silicone elastomers I.7.1 Characterization of the processing properties of the uncrosslinked silicone rubber compositions The uncrosslinked silicone rubber composition of the invention has a reduced tack compared to conventional, in particular to H-siloxane-containing, compositions. This is shown, on the one hand, by the tendency of the silicone composition to stick to the rolls being significantly reduced and, on the other hand, by a reduced tendency of the milled silicone sheets to stick to one another (reduced blocking). Compared to H-siloxane-containing compositions, the silicone compositions of the invention have an increased strength of the milled sheet. Tendency to stick to the rolls, tendency of the milled sheets to stick to one another and strength of the milled sheet are well known and very important processing criteria to those skilled in the art. Overall, the uncrosslinked compositions of the invention have reduced tack, higher suppleness, and higher strength of the milled sheet as well as a dryer feel, and thus exhibit significantly better processing properties. Although such processing properties are usually evaluated subjectively, an attempt has been made to quantify them as objective parameters by means of rheological measurements.

In order to obtain comparable rheological measurements, the measurement was in each case carried out 7 days after preparation of the finished, but still peroxide-free, silicone rubber composition which was milled at room temperature for 5 minutes on a laboratory roll mill prior to the rheological measurement to give an approximately 2 mrnm thick sheet. This procedure establishes the characteristic processing properties. Immediately afterwards, a disk (diameter 25 mm) was cut from this sheet and placed between the plates (diameter 25 mm) of a rheometer (model RDA II; Rheometric Scientific GmbH) and the rheological measurement was begun at room temperature. Two different types of measurement were employed separately. Measurement type A: logarithmic frequency sweep at 25° C., plate-plate system, plate spacing 2 mm, deformation amplitude 10%, initial frequency 0.01 Hz, fmal frequency 10 Hz, 5 measurement points per frequency decade. Measurement type B: logarithmic amplitude sweep at 25° C., plate-plate system, plate spacing 2 mm, measuring frequency (f) 1 Hz, initial deformation 0.05%, final deformation 100%, 10 measurement points per decade.

The rheological measurements make it possible to determine the elastic and viscous components of the deformation behavior of the silicone rubber compositions separately. The in-phase response of the material expressed by the storage modulus in shear, G'(f) [MPa], represents a measure of the elastic component while the loss modulus in shear, G"(f) [MPa], represents the material response shifted by 90°, thus giving a measure of the viscous component of the deformation behavior. The greater the phase shift δ between shear stress and deformation, the more pronounced the viscous character of the silicone rubber composition. The presence of relatively short-chain polymer constituents in the silicone rubber composition, e.g. polymethylhydrogensiloxane, basically increases the viscous character of the composition, which is reflected in an increasing G"/G' ratio; in particular the elastic component of the deformation behavior is decreased with increasing content of relatively short-chain organosiloxanes. More viscous and less elastic behavior is associated with an increase in the tack and a decrease in the strength of the milled sheet (green strength) which, since compositions having a comparable make-up are being considered, can be quantified and confirmed by the changes in the storage modulus and loss modulus.

I.7.2 Characterization of the demoldability

The compositions of the invention have, compared to polymethylhydrogensiloxane-containing compositions, a significantly improved demoldability. Since the reduced demoldability is caused by increased adhesion of the crosslinked composition to the mold surface, the latter was quantified by tensile shear tests. For this purpose, the peroxide-containing silicone rubber composition was applied to a steel sheet having a thickness of 1.2 mm and a width of 25 mm and covered with a second steel sheet of the same dimensions so that these overlap on an area of 25 mm by 15 mm, and are connected by a 0.1 mm thick layer of the silicone rubber composition (thickness of the layer is set by means of a 0.1 mm thick steel wire). This contruction was exposed to a temperature of 170° C. for 5 minutes, with the adhesion area being subjected to a compressive force of 100 N during the crosslinking time. The adhesive strength, $F_A$ [N/mm$^2$], the quotient of the maximum force and the adhesion area, was determined in a tensile shear test in accordance with DIN 53283, using a prestressing force of 0.5 N and a test speed of 10 mm/min.

I.7.3 Characterization of yellowing

The characterization of yellowing was carried out on 6 mm thick silicone elastomer sheets in accordance with DIN 6167, DIN 5033 and DIN 53263 by means of the standard color indices X, Y and Z which were determined using standard light D 65 and a 2° standard observer. The color measurement was carried out using a Minolta Chroma Meter CR 300. The yellowness G was calculated from the standard color indices X, Y and Z in accordance with DIN 6167 using the following formula:

$$G = (aX - bZ)100/Y, \text{ where } a=1.298 \text{ and } b=1.133.$$

The yellowness values of the silicone elastomer sheets determined in this way correlate well with the subjective impression of the intensity of yellowing; the greater the G value, the more pronounced the yellowing.

COMPARATIVE EXAMPLE (comparative example not according to the invention):

The preparation of the base mixture by the method described under 1.5 was carried out using only the hydrophobic silica prepared by method 1.4. The processing properties of this uncrosslinked silicone rubber composition were characterized by means of the Theological measurements (cf. Tab. 2a, 2b) and the tensile shear test (cf. Tab. 1). The yellowing of the silicone elastomers prepared therefrom as described in 1.6 was assessed as described in 1.7.3 (cf. Tab. 3).

EXAMPLE 1

(according to the invention):

The base mixture was prepared by the method described under I.5 using a mixture consisting of 25.0 parts by weight of silica I.4 and 22.1 parts by weight of silica I.2. The processing properties of this uncrosslinked silicone rubber composition were characterized by means of the Theological measurements (cf. Tab. 2a, 2b) and the tensile shear test (cf. Tab. 1). The yellowing of the silicone elastomers prepared therefrom as described in I.6 was assessed as described in I.7.3 (cf. Tab. 3).

EXAMPLE 2

(according to the invention):

The base mixture was prepared by the method described under I.5 using a mixture consisting of 2.9 parts by weight of silica I.4 and 44.2 parts by weight of silica I.2. The processing properties of this uncrosslinked silicone rubber composition were characterized by means of the Theological measurements (cf. Tab. 2a, 2b) and the tensile shear test (cf. Tab. 1). The yellowing of the silicone elastomers prepared therefrom as described in I.6 was assessed as described in I.7.3 (cf. Tab. 3).

EXAMPLE 3

(according to the invention):

The base mixture was prepared by the method described under I.5 using a mixture consisting of 36.4 parts by weight of silica I.4 and 10.7 parts by weight of silica I.1. The processing properties of this uncrosslinked silicone rubber composition were characterized by means of the rheological measurements (cf. Tab. 2a, 2b) and the tensile shear test (cf. Tab. 1). The yellowing of the silicone elastomers prepared therefrom as described in I.6 was assessed as described in I.7.3 (cf. Tab. 3).

EXAMPLE 4

(according to the invention):

The base mixture was prepared by the method described under I.5 using a mixture consisting of 25.8 parts by weight of silica I.4 and 21.3 parts by weight of silica I.1. The processing properties of this uncrosslinked silicone rubber composition were characterized by means of the Theological measurements (cf. Tab. 2a, 2b) and the tensile shear test (cf. Tab. 1). The yellowing of the silicone elastomers prepared therefrom as described in I.6 was assessed as described in I.7.3 (cf. Tab. 3).

EXAMPLE 5

(according to the invention):

The base mixture was prepared by the method described under I.5 using a mixture consisting of 31.4 parts by weight of silica I.4 and 15.7 parts by weight of silica 1.3. The processing properties of this uncrosslinked silicone rubber composition were characterized by means of the rheological measurements (cf. Tab. 2a, 2b) and the tensile shear test (cf. Tab. 1). The yellowing of the silicone elastomers prepared therefrom as described in I.6 was assessed as described in I.7.3 (cf. Tab. 3).

EXAMPLE 6

(according to the invention):

The base mixture was prepared by the method described under I.5 using a mixture consisting of 15.7 parts by weight of silica I.4 and 31.4 parts by weight of silica 1.3. The processing properties of this uncrosslinked silicone rubber composition were characterized by means of the Theological measurements (cf. Tab. 2a, 2b) and the tensile shear test (cf. Tab. 1). The yellowing of the silicone elastomers prepared therefrom as described in I.6 was assessed as described in I.7.3 (cf. Tab. 3).

COMPARATIVE EXAMPLE C2

(comparative example not according to the invention):

The base mixture was prepared by the method described under I.5 using 47.1 parts by weight of silica 1.4. Subsequently, 0.53 part by weight of trimethylsilyl-terminated polymethylhydrogensiloxane having a number average degree of polymerization of 35 was homogeneously mixed into 100 parts by weight of this base mixture for 10 minutes at room temperature in a laboratory kneader. The processing properties of this uncrosslinked silicone rubber composition were characterized by means of the Theological measurements (cf. Tab. 2a, 2b) and the demoldability of the crosslinked composition was characterized by means of the tensile shear test (cf. Tab. 1). The yellowing of the silicone elastomers prepared therefrom as described in I.6 was assessed as described in I.7.3 (cf. Tab. 3).

COMPARATIVE EXAMPLE C3

(comparative example not according to the invention):

The base mixture was prepared by the method described under I.5 using 47.1 parts by weight of silica I.4. Subsequently, 1.06 parts by weight of a trimethylsilyl-terminated polymethylhydrogensiloxane having a number average degree of polymerization of 35 was homogeneously mixed into 100 parts by weight of this base mixture for 10 minutes at room temperature in a laboratory kneader. The processing properties of this uncrossliiked silicone rubber composition were characterized by means of the Theological measurements (cf. Tab. 2a, 2b) and the tensile shear test (adhesive strength, cf. Tab. 1). The yellowing of the silicone elastomers prepared therefrom as described in I.6 was assessed as described in I.7.3 (cf. Tab. 3).

EXAMPLE 7

(according to the invention):

Corresponds to Example 2, except that a silica mixture consisting of 42.4 parts by weight of silica I.4 and 4.7 parts by weight of silica I.2 were used. The yellowing of the silicone elastomers prepared therefrom as described in I.6 was assessed as described in I.7.3 (cf. Tab. 4).

EXAMPLE 8

(according to the invention):

Corresponds to Example 2, except that a silica mixture consisting of 35.3 parts by weight of silica I.4 and 11.8 parts by weight of silica I.2 were used. The yellowing of the silicone elastomers prepared therefrom as described in I.6 was assessed as described in I.7.3 (cf. Tab. 4).

EXAMPLE 9

(according to the invention):

Corresponds to Example 2, except that a silica mixture consisting of 23.55 parts by weight of silica I.4 and 12.55 parts by weight of silica I.2 were used. The yellowing of the silicone elastomers prepared therefrom as described in I.6 was assessed as described in I.7.3 (cf. Tab. 4).

EXAMPLE 10

(according to the invention):

Corresponds to Example 2, except that a silica mixture consisting of 11.8 parts by weight of silica I.4 and 35.3 parts by weight of silica I.2 were used. The yellowing of the silicone elastomers prepared therefrom as described in I.6 was assessed as described in I.7.3 (cf. Tab. 4).

EXAMPLE 11

(according to the invention):

Corresponds to Example 2, except that 47.1 parts by weight of silica I.2 were used. The yellowing of the silicone elastomers prepared therefrom as described in I.6 was assessed as described in I.7.3 (cf. Tab. 4).

COMPARATIVE EXAMPLE C4

(comparative example not according to the invention):

The base mixture was prepared by the method described under I.5 using 48.0 parts by weight of silica 1.4. Subsequently, 2 parts by weight of trimethylsilyl-termiated polymethylhydrogensiloxane having a number average degree of polymerization of 35 were homogeneously mixed into 100 parts by weight of this base mixture for 10 minutes at room temperature in a laboratory kneader. The processing properties of this uncrosslinked silicone rubber composition were characterized by means of the Theological measurements (cf. Tab. 2a, 2b).

COMPARATIVE EXAMPLE C5

(comparative example not according to the invention):

The base mixture was prepared by the method described under I.5 using 49.5 parts by weight of silica 1.4. Subsequently, 5 parts by weight of trimethylsilyl-terminated polymethylhydrogensiloxane having a number average degree of polymerization of 35 were homogeneously mixed into 100 parts by weight of this base mixture for 10 minutes at room temperature in a laboratory kneader. The processing properties of this uncrosslinked silicone rubber composition were characterized by means of the rheological measurements (cf. Tab. 2a, 2b).

COMPARATIVE EXAMPLE C6

(comparative example not according to the invention):

The base mixture was prepared by the method described under I.5 using 50.9 parts by weight of silica 1.4. Subsequently, 8 parts by weight of trimethylsilyl-ternnnated polymethylhydrogensiloxane having a number average degree of polymerization of 35 were homogeneously mixed into 100 parts by weight of this base mixture for 10 minutes at room temperature in a laboratory kneader. The processing properties of this uncrosslinked silicone rubber composition were characterized by means of the Theological measurements (cf Tab. 2a, 2b).

TABLE 1

Adhesive strength of the bonded assemblies produced using the silicone compositions from Examples 1 to 6 according to the invention, and Comparative Example C1 not according to the invention. H content is based on Si-bonded hydrogen.

| Example No. | Additive | H content of the composition [ppm by weight] | Adhesive strength $F_A$ [N/mm$^2$] |
|---|---|---|---|
| C1 | none | 0.00 | 0.67 |
| 1 | I.2 | 87.00 | 0.78 |
| 2 | I.2 | 174.00 | 0.75 |
| 3 | I.1 | 87.00 | 0.69 |
| 4 | I.1 | 174.00 | 0.72 |
| 5 | I.3 | 85.00 | 0.92 |
| 6 | I.3 | 170.00 | 1.03 |
| C2 | H-siloxane | 87.00 | 1.58 |
| C3 | H-siloxane | 173.00 | 1.63 |

As can be seen from Table 1, the bonded assemblies produced using polymethylhydrogensiloxane-containing compositions have, despite a comparable SiH content in the compositions, significantly higher adhesive strengths than when using SiH-containing silicas. Increased adhesive strength values indicate a deterioration in the demoldability of the crosslinked silicone elastomers. The silicone rubber compositions of the invention do not have this disadvantage or have it to a considerably reduced extent.

TABLE 2a

Rheological parameters corresponding to measurement type A for silicone rubber compositions according to and not according to the invention

| Example | Measurement type | G'(1Hz) [kPa] | G"(1Hz) [kPa] | G"(1Hz)/G'(1 Hz) | δ(1Hz) [degree] |
|---|---|---|---|---|---|
| C1 | A | 64.80 | 57.40 | 0.89 | 41.50 |
| 1 | A | 76.40 | 64.00 | 0.84 | 39.90 |
| 2 | A | 104.20 | 82.30 | 0.79 | 38.30 |
| 3 | A | 51.60 | 43.80 | 0.85 | 40.30 |
| 4 | A | 87.40 | 71.70 | 0.82 | 39.30 |
| 5 | A | 83.90 | 68.20 | 0.81 | 39.10 |
| 6 | A | 112.70 | 87.70 | 0.78 | 37.90 |
| C2 | A | 68.50 | 61.20 | 0.89 | 41.80 |
| C3 | A | 65.40 | 59.20 | 0.91 | 42.20 |
| C4 | A | 56.70 | 55.30 | 0.98 | 44.30 |
| C5 | A | 47.80 | 48.80 | 1.02 | 45.60 |
| C6 | A | 39.60 | 45.70 | 1.15 | 49.10 |

The data shown in Table 2a illustrate the Theological differences which result from mixing an H-siloxane on the one hand, or an SiH-contaiing silica on the other hand, into a silicone rubber composition at an unchanged weight ratio of polymer-type to filler-type constituents. The use of H-siloxane (cf. Examples C2–C6, not according to the invention) causes, particularly at a relatively high content, a considerable decrease in the storage modulus which represents a measure of the elastic character on deformation of the composition. At the same time, the loss modulus G" experiences a relative increase, which is reflected in increasing values of the ratio G"/G'. This is a consequence of an increasing phase shift δ between shear stress and deformation, i.e. the viscous character of the composition increases. This is associated with an increase in the tendency to stick to the rolls and the tedency of the milled sheets to stick to one another, and with a decrease in the strength of the sheet. These disadvantageous effects do not occur when part of the filler is replaced by a corresponding amount of SiH-containing silica. Since an SiH-containing silica is not a polymer-type constituent, the viscous character of the composition is not increased; depending on the degree of hydrophobicity of the SiH-containing silica, the viscous character of the composition can even be reduced, i.e. the stickiness of the composition can be decreased and the strength of the milled sheet can be increased. This is evidenced by the similar or even higher values of the storage modulus (compared to the standard composition (Comparative Example Cl)) and the lower values of the phase shift δ of the silicone rubber compositions according to the invention (examples 1-6).

TABLE 2b

Rheological parameters corresponding to measurement type B for silicone rubber compositions according to and not according to the invention

| Example | Measurement type | G'(0.05%) [kPa] | G'(100%) [kPa] | δ (100%) [degree] |
|---|---|---|---|---|
| C1 | B | 332.00 | 34.00 | 46.40 |
| 1 | B | 343.00 | 40.00 | 43.60 |
| 2 | B | 566.00 | 38.00 | 43.20 |
| 3 | B | 355.00 | 36.00 | 44.10 |
| 4 | B | 379.00 | 39.00 | 45.70 |
| 5 | B | 391.00 | 38.00 | 45.90 |
| 6 | B | 542.00 | 41.00 | 45.10 |
| C2 | B | 310.00 | 34.00 | 45.60 |
| C3 | B | 296.00 | 30.00 | 46.30 |
| C4 | B | 278.00 | 28.00 | 47.70 |
| C5 | B | 249.00 | 25.00 | 48.20 |
| C6 | B | 136.00 | 14.00 | 50.70 |

The data in Table 2b illustrate the changes in the storage modulus G' and in the phase shift δ which occur when increasing shear is applied to the silicone rubber composition. Before an HTV silicone rubber composition is crosslinked, it is customarily mixed on a roll mill with the crosslinker, a peroxide, and, if desired, further additives (colorants, etc). The shearing of the composition which occurs here leads to characteristic Theological changes: in general, milling leads to a softening of the composition. However, for further processing, it is usually necessary for the strength of the milled sheet to be retained and no tendency to stick to the rolls to occur despite softening, i.e. the elasticity of the silicone rubber sheet should be retained. The data in Table 2b show that the rheological behavior is less adversely affected by application of shear when using SiH-containing silicas than when using H-siloxane. This is reflected, inter alia, in higher values of the storage modulus G' even after intensive shearing and in a comparatively low phase shift δ after shearing of the compositions according to the invention; the significantly higher initial G' level has to be taken into account.

TABLE 3

Assessment of yellowing of the silicone elastomers according to the invention (Examples 1–6) and not according to the invention (Comparative Examples C1–C3) by means of the standard color indices X, Y and Z and the yellowness values G. The H-content is based on Si-bonded hydrogen.

| Example | SiH-containing additive | H-content of the composition [ppm by weight] | X | Y | Z | G |
|---|---|---|---|---|---|---|
| C1 | none | 0.00 | 30.17 | 31.34 | 18.77 | 57.10 |
| 1 | I.2 | 87.00 | 31.98 | 33.30 | 25.13 | 39.15 |

TABLE 3-continued

Assessment of yellowing of the silicone elastomers according to the invention (Examples 1–6) and not according to the invention (Comparative Examples C1–C3) by means of the standard color indices X, Y and Z and the yellowness values G. The H-content is based on Si-bonded hydrogen.

| Example | SiH-containing additive | H-content of the composition [ppm by weight] | X | Y | Z | G |
|---|---|---|---|---|---|---|
| 2 | I.2 | 174.00 | 31.83 | 33.06 | 26.09 | 35.56 |
| 3 | I.1 | 87.00 | 28.63 | 29.66 | 21.13 | 44.58 |
| 4 | I.1 | 174.00 | 27.18 | 28.10 | 20.80 | 41.68 |
| 5 | I.3 | 85.00 | 28.12 | 29.49 | 20.95 | 43.28 |
| 6 | I.3 | 170.00 | 27.52 | 29.28 | 22.36 | 35.48 |
| C2 | H-siloxane | 87.00 | 27.74 | 28.60 | 20.13 | 46.05 |
| C3 | H-siloxane | 173.00 | 28.81 | 29.67 | 23.39 | 36.72 |

The values given in Table 3 show that the degree of reduction in yellowing is determined prinmarily by the SiH content of the silicone elastomer. Thus, at a comparable SiH content, the elastomers containing H-siloxane and those containing SiH-containing silicas have similar yellowing; it can be seen that the yellowing decreases with increasing SiH content.

TABLE 4

Assessment of yellowing of the silicone elastomers according to the invention (Examples 7–11), and not according. to the invention (Comparative Example C1) by means of the standard color indices X, Y and Z and the yellowness values G. H-content is based on Si-bonded hydrogen.

| Example | H-content of the composition [ppm by weight] | X | Y | Z | G |
|---|---|---|---|---|---|
| C1 | 0.00 | 29.84 | 30.75 | 19.02 | 55.88 |
| 7 | 14.00 | 32.51 | 33.66 | 22.36 | 50.10 |
| 8 | 34.00 | 31.63 | 32.64 | 23.14 | 45.46 |
| 9 | 68.00 | 31.91 | 32.97 | 24.59 | 41.12 |
| 10 | 102.00 | 31.84 | 32.83 | 24.94 | 39.82 |
| 11 | 137.00 | 32.40 | 33.40 | 26.42 | 36.06 |

As can be seen from the data in Table 4, the yellowing is considerably decreased as the content of Si-bonded hydrogen fixed to the surface of the silica increases.

What is claimed is:

1. A peroxidically crosslinkable silicone rubber composition comprising one or more peroxidically crosslinkable polyorpanosiloxane(s), one or more peroxide crosslinking catalyst(s), and containing a filler having covalently bound Si—H-containing groups.

2. A peroxidically crosslirkable silicone rubber composition as claimed in claim 1, comprising (A) organosiloxanes comprising units of the formula

$$R^1_a SiO_{(4-a)/2} \quad (I)$$

where the radicals $R^1$ can be identical or different and are each a substituted or unsubstituted hydrocarbon radical having from 1 to 20 carbon atoms or H or OH and a is 0, 1, 2 or 3.

3. A peroxidically crosslinkable silicone rubber composition as claimed in claim 1, wherein the substrate of the filler having covalently bound Si—H-containing groups comprises silicon dioxide.

4. A process for preparing a composition as claimed in claim 1, comprising mixing an organopolysiloxane with an Si—H-containing filler.

5. A process for preparing a composition as claimed in claim 4, wherein the organopolysiloxane comprises (A) organosiloxanes comprising units of the formula

$$R^1_a SiO_{(4-a)/2} \quad (1)$$

where the radicals $R^1$ can be identical or different and are each a substituted or unsubstituted hydrocarbon radical having from I to 20 carbon atoms or H or OH and a is 0, 1, 2 or 3.

6. The process for preparing a composition as claimed in claim 4, wherein the substrate of the Si—H-containing filler comprises silicon dioxide.

7. The process for preparing a composition as claimed in claim 5, wherein the substrate of the Si—H-containing filler comprises silicon dioxide.

8. A molding, coating or sealing composition comprising a composition as claimed in claim 1.

9. A molding, coating or sealing composition comprising a composition as claimed in claim 2.

10. A molding, coating or sealing composition comprising a composition as claimed in claim 3.

11. A molding, coating, or sealing composition comprising a composition prepared by the process of claim 4.

12. A molding, coating, or sealing composition comprising a composition prepared by the process of claim 5.

13. A molding, coating, or sealing composition comprising a composition prepared by the process of claim 6.

14. In a peroxidically curable HTV silicone elastomer composition comprising one or more peroxidically crosslinkable polyorganosiloxane(s), one or more peroxide crosslinking catalyst(s), and containing a filler, the improvement comprising replacing at least a portion of said filler with a filler having Si—H groups bonded thereto.

15. The elastomer of claim 14, comprising:

(A) organosiloxanes comprising units of the formula

$$R^1_a SiO_{(4-a)/2} \quad (I)$$

where the radicals $R^1$ can be identical or different and are each a substituted or unsubstituted hydrocarbon radical having from 1 to 20 carbon atoms or H or OH and a is 0, 1, 2 or 3, (B) an effective yellowing decreasing amount of one or more fillers having Si—H bonded hydrogen, selected from the group consisting of (B)(1) inorganic fillers having a BET surface area greater than 0.1 m²/g and modified by reaction with an H-functional silane to contain surface bound Si—H functionality, and (B)(2) finely divided organopolysiloxane solid resin containing Si—H functional moieties.

16. The elastomer of claim 15, wherein said filler having Si—H bonded hydrogen is present in an amount which supplies from about 1 ppm Si—H to about 2000 ppm of Si—H based on the total weight of the elastomer composition.

17. A cured, peroxidically curable elastomer comprising the cured composition of claim 14.

18. A cured, peroxidically curable elastomer comprising the cured composition of claim 15.

19. A cured, peroxidically curable elastomer comprising the cured composition of claim 16.

* * * * *

UNITED STATES PATENT AND TRADEMARK OFFICE
CERTIFICATE OF CORRECTION

PATENT NO. : 6,194,508 B1
DATED : February 27, 2001
INVENTOR(S) : Frank Achenbach, et al.

It is certified that error appears in the above-identified patent and that said Letters Patent is hereby corrected as shown below:

Column 15,
Line 49, Claim 1: delete "polyorpanosiloxane(s) and insert -- polyorganosiloxane (s) --.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*